J. A. PERKINS.
ROLLER BEARING.
APPLICATION FILED NOV. 3, 1908.
1,002,440.
Patented Sept. 5, 1911.
2 SHEETS—SHEET 1.
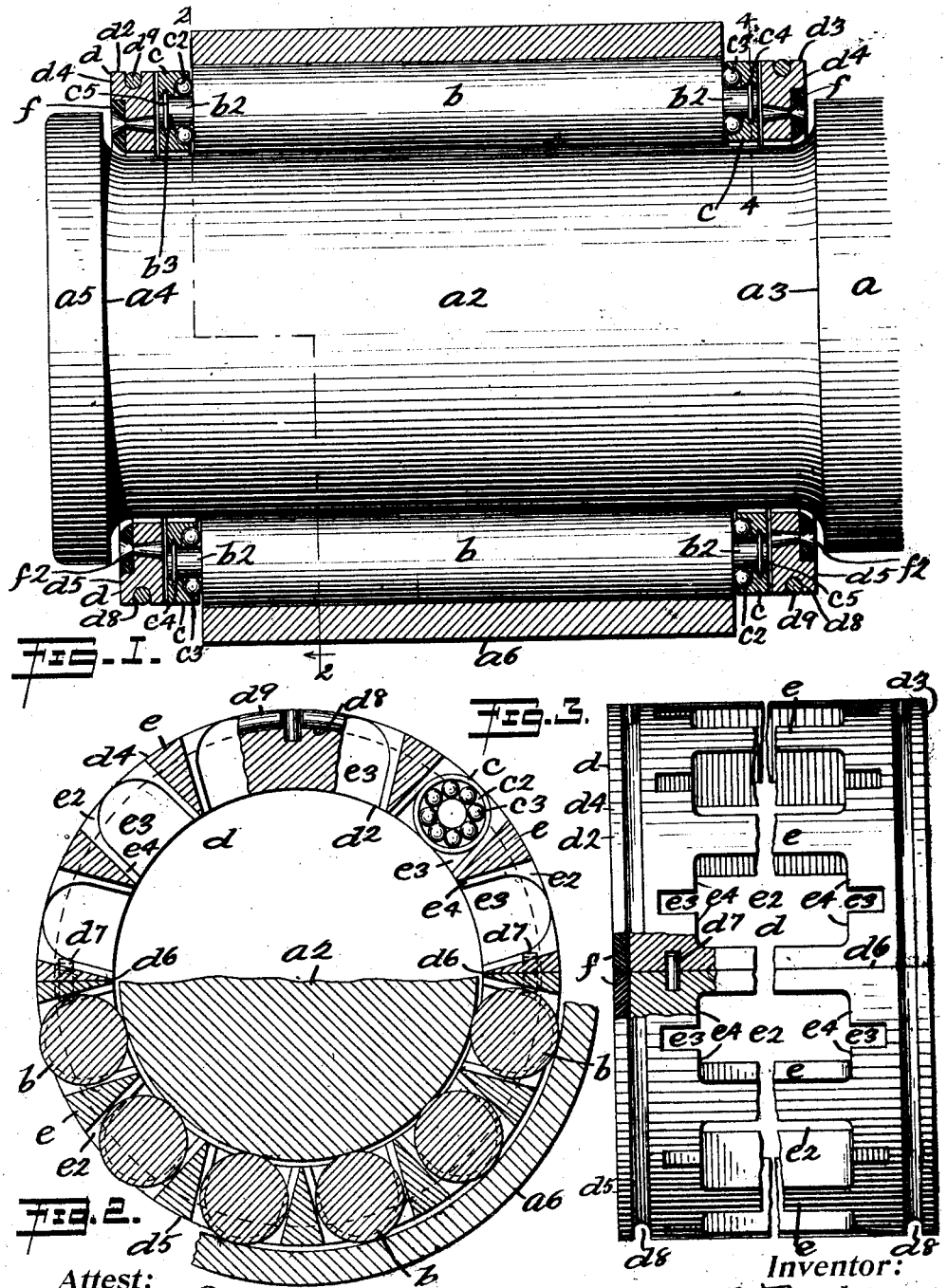
Attest:
G. Robert Thomas
George D. Munn
Inventor:
Julius A. Perkins
by J. Ellis Larsen
his Atty J. A. PERKINS.
ROLLER BEARING.
APPLICATION FILED NOV. 3, 1908.
1,002,440.
Patented Sept. 5, 1911.
2 SHEETS—SHEET 2.
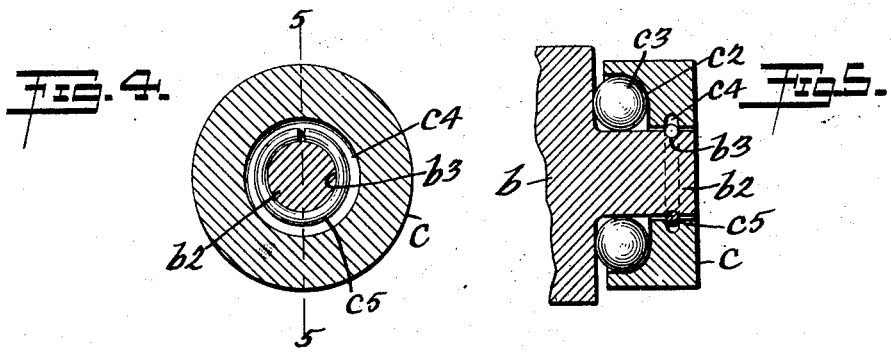
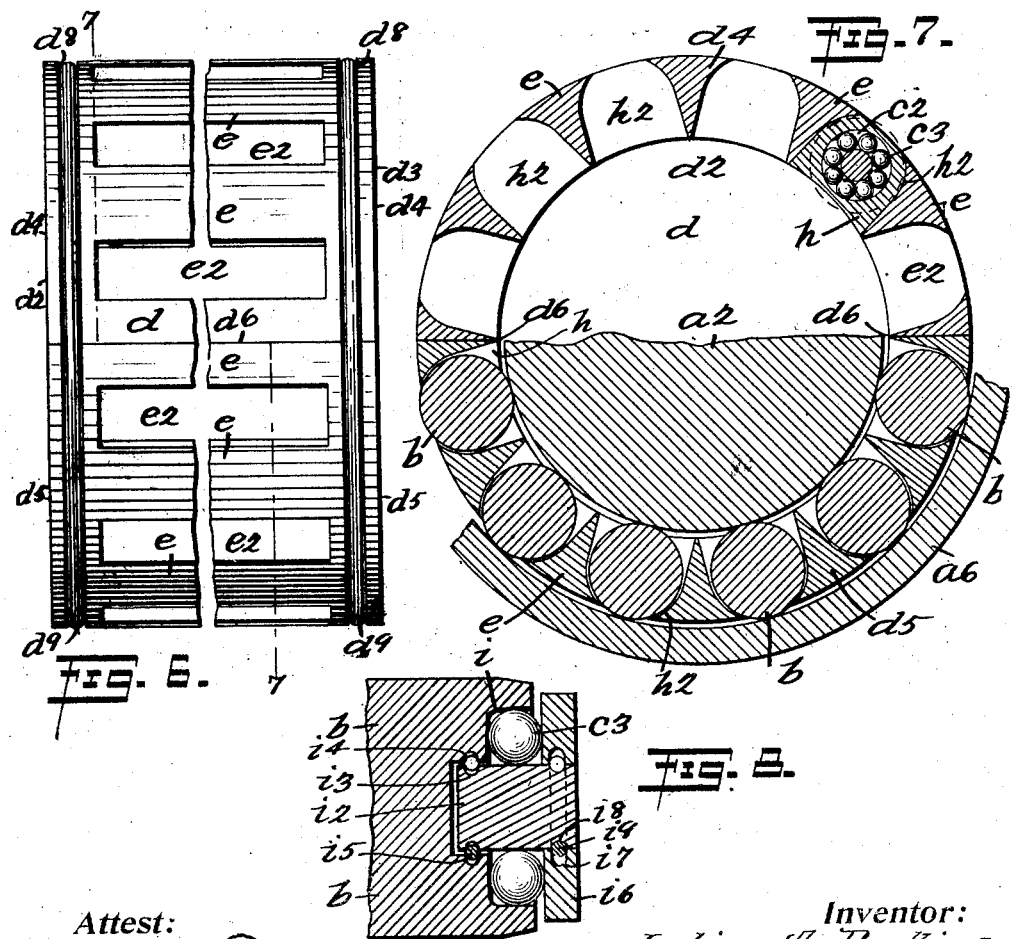

UNITED STATES PATENT OFFICE.

JULIUS A. PERKINS, OF OMAHA, NEBRASKA.

ROLLER-BEARING.

1,002,440.

Specification of Letters Patent. Patented Sept. 5, 1911.

Application filed November 3, 1908. Serial No. 460,833.

*To all whom it may concern:*

Be it known that I, JULIUS A. PERKINS, a citizen of the United States of America, and residing at Omaha, in the county of Douglas and State of Nebraska, have invented certain new and useful Improvements in Roller-Bearings, of which the following is a specification, such as will enable those skilled in the art to which it appertains to make and use the same.

This invention relates to bearings, particularly to roller bearings, and the main object thereof is to provide devices of this class which are anti-frictional and, therefore, practically indestructible in ordinary use, my present invention differing from that shown in a co-pending application, Ser. No. 459,815, in that anti-frictional end thrusts, attached to and carried by the rollers, are employed instead of the frictional bearing blocks in the said co-pending application, the subject matter of the latter being intended more particularly for heavy machinery and the like where the rollers are supported by the bearing blocks at times.

Another object is to produce this result with solid rollers whereby, for a given load, much less space is required for the said bearings.

Another object is to provide anti-frictional guides and end-thrusts for the rollers whereby the axes of the latter are maintained in exact axial planes of the journal of the shaft, axle, or the like, about which said rollers move, thus supporting the load throughout the length of the rollers and insuring proper and positive movement of the elements of the said bearings, and also preventing friction and consequent wear of either the said rollers or co-acting parts.

Another object is to make the said guides and end-thrusts component parts of the said rollers.

Another object is to provide a carrier for the said rollers and guides which is readily assembled upon, and as readily separated from, the said journal.

Another object is to provide means whereby either end of each of the said rollers is independently movable, radially of the journal, in the said carrier; and a still further object is to construct the said bearings so that no injury will ordinarily occur to the parts thereof, when not assembled, because of careless handling.

My invention is fully described in the following specification, of which the accompanying drawings form a part, in which the same reference characters are used to indicate the same parts in each of the views, and in which:—

Figure 1 is a central section taken through a bearing constructed according to this invention; Fig. 2 is a transverse section taken on the line 2—2 of Fig. 1 with the lower half of the axle journal shown in section; Fig. 3 is an elevation of the carrier or cage, partly in section and the center broken away; Fig. 4 is an enlarged section taken on the line 4—4 of Fig. 1; Fig. 5 is a section taken on the line 5—5 of Fig. 4; Fig. 6 is a view similar to Fig. 3, but showing a modification thereof; Fig. 7 is a view, similar to Fig. 2 taken on the line 7—7 of Fig. 6; and Fig. 8 is a modification over the construction shown in Figs. 4 and 5.

In the drawings forming a part of this application, I have shown an axle of the type employed upon railway cars, and comprising the axle proper $a$, and a reduced journal $a^2$, forming shoulders $a^3$ and $a^4$ and the end flange $a^5$, all of the usual formation, and at $a^6$ I have shown a roller outer bearing sleeve for my bearings.

Interposed between the journal $a^2$ and outer bearing sleeve $a^6$ are a plurality of rollers $b$, solid as shown, and provided each with end journals $b^2$ at the ends thereof, each of which is annularly grooved, as shown at $b^3$, the said rollers being shorter than the journal.

Mounted upon each of the roller journals $b^2$ is a block $c$ provided with a raceway $c^2$ in which are arranged balls $c^3$ bearing against the corresponding roller ends, the said blocks being internally grooved, as shown at $c^4$, adapted, together with the groove $b^3$ to engage a ring $c^5$, loosely, so that a lock is formed between the roller journal and block which permits free rotary movement, as well as some transverse but not lateral movement therebetween.

Arranged about the journal $a^2$ is a roller carrier or cage $d$, comprising end plates $d^2$ and $d^3$, each of which is composed of two segmental members $d^4$ and $d^5$ joined at $d^6$ and held against lateral movement by means of dowels $d^7$, the end plates being also provided with peripheral grooves $d^8$, to receive rings $d^9$ which serve to hold the segmental members of the plates $d^2$ and $d^3$ together when my cage is assembled and, as shown in Fig. 2, I provide a pin which positions the opening between the ends of the rings $d^9$ at a point remote from the joint $d^6$ thereby preventing the said opening from being turned into the position of the said joint, and it will be understood that the rings $d^9$ and $c^5$ are made of spring metal whereby they may be forced into the respective positions without being permanently bent from their formation of a ring. The end plates $d^2$ and $d^3$ are joined together by means of longitudinally arranged and equally spaced cross bars or ribs $e$, forming roller spaces $e^2$ therebetween and the said end plates are provided, each, with a recess $e^3$ in the position of each of the roller spaces $e^2$, but of a smaller transverse diameter and forming shoulders $e^4$ between the edges thereof and the ribs $e$, as shown in Fig. 3, these recesses being curved at one edge of the plates $d^2$ and $d^3$ and open at the other edge, thus serving to hold the blocks $c$ against side movement, but permitting radial movement thereof, within certain limits, thereby permitting the rollers carried thereby to adjust themselves to irregularities or variations of diameter in the journals or boxes, but maintaining the roller axes in corresponding axial planes of the said journal, equidistant from each other and away from the ribs $e$.

Upon the outer faces of the end plate members $d^4$ and $d^5$, I arrange a segmental strip $f$, of fiber or other suitable anti-friction material, said strips forming cage controllers at the point of contact thereof with the shoulders $a^3$ and $a^4$, the conformation of the inner edge of the said controllers being similar to that of the shoulders, the said controllers being secured to the end plates in any desired manner but, in practice, I prefer to employ rivets $f^2$ which are tapered through the end plates and the rivet heads formed in inclined recesses in the controllers, thereby holding the latter in position even though they should, in time, be worn nearly through.

In the form of construction described, I prefer to make the blocks $c$ circular, thereby permitting rotation thereof in their seats, and also of a smaller diameter than the rollers carried thereby, there being no necessity, however, for rotation of the said blocks because of the free rotation of the roller journals therein, upon the balls $c^3$, said balls serving also as an anti-frictional end-thrust for the said rollers.

In Figs. 6 and 7, I have shown a modification over the cage construction described, in that I provide blocks $h$ of greater diameter than the rollers $b$, thereby making the width of the ribs $e$ and roller spaces $e^2$ uniform throughout the length thereof and dispensing with shoulders at the recesses $h^2$, this form of construction being better adapted to some uses of my bearings, and it will be seen that I make the blocks $h$ of the same formation as the recesses $h^2$, thereby preventing rotation thereof but not preventing movement radially of the journal.

In Fig. 8 is shown a modification over the form of anti-frictional end guides described, in that I provide the ends of the rollers with recesses $i$ for the roller raceway and instead of the roller journals shown, I provide stub shafts $i^2$ which project into the said rollers and are provided with grooves $i^3$ which, together with a similar groove $i^4$ in the roller, serves to hold a ring $i^5$ in the manner previously described, the block $i^6$ being either integral with the said shaft or detachably connected therewith by means of grooves $i^7$ and $i^8$ and a ring $i^9$ or in any other suitable manner, the flexible connection resulting which was described with reference to the blocks $c$.

In assembling my bearing about a journal, I first place the rollers $b$ with their end blocks $c$, $h$, or $i^6$, in one of the segmental parts of the cage, which is then placed beneath the journal and rotated thereover to the top thereof, after which the other cage section, having been similarly provided with rollers and blocks, is also placed against the journal in such manner as to place the dowels $d^7$ in engagement with the cage members, at which time the rings $d^9$ are sprung into position and the cage is assembled and the raceway $a^5$ may then be placed in position, or, if the latter be fixed, the journal and cage may be passed thereinto, and my bearings are complete and ready for use.

By reference to Fig. 1, it will be seen that an anti-frictional bearing is produced for the rotary movement of the journal because of the rollers $b$ and, the load being on the said rollers, longitudinal movement of the rollers due to longitudinal movement of the axle and journal is taken up anti-frictionally because of the balls $c^3$ and their raceways, thus preventing wear on either the journal, the raceway $a^6$, or the rollers and parts, and thereby making my bearings practically indestructible. The blocks being a component part of the rollers, and not easily detached therefrom, said rollers may be handled with great lack of care without any injury resulting thereto, this being true also of the cage members, and, because of the blocks being movable in their recesses, free movement of either end of each of the rollers is possible, with relation to and radially of the journal, thereby compensating for inequalities, imperfections and irregularities in the latter. My invention being, therefore, an anti-frictional roller having an anti-frictional end guide and end-thrust, it will be evident that many changes in and modifications of the forms of construction shown and described, may be made, within the scope of the following claims and, reserving the right to all such modifications,

What I claim as new and desire to secure by Letters Patent, is:—

1. As an article of manufacture, for use in a bearing, a roller having an anti-frictional end-thrust device attached to each end and forming a component part thereof and portable therewith.

2. As an article of manufacture, for use in a bearing, a roller having an anti-frictional end-thrust device rotatably attached to each end and forming a component part thereof and portable therewith.

3. As an article of manufacture, for use in a bearing, a roller having an anti-frictional end-thrust device flexibly attached to each end and forming a component part thereof and portable therewith.

4. As an article of manufacture, for use in a bearing, a roller having an anti-frictional end-thrust device rotatably and flexibly attached to each end and forming a component part thereof and portable therewith.

5. As an article of manufacture, for use in a bearing, a roller, a block attached to each end thereof, and anti-friction means interposed between said blocks and roller ends, said blocks and anti-friction means forming a component part of said roller and portable therewith.

6. As an article of manufacture, for use in a bearing, a roller, a block rotatably attached to each end thereof, and anti-friction means interposed between said blocks and roller ends, said blocks and anti-friction means forming a component part of said roller and portable therewith.

7. As an article of manufacture, for use in a bearing, a roller, a block flexibly attached to each end thereof, and anti-friction means interposed between said blocks and roller ends, said blocks and anti-friction means forming a component part of said roller and portable therewith.

8. As an article of manufacture, for use in a bearing, a roller, a block rotatably and flexibly attached to each end thereof, and anti-friction means interposed between said blocks and roller ends, said blocks and anti-friction means forming a component part of said roller and portable therewith.

9. As an article of manufacture, for use in a bearing, a roller, a cup-shaped block attached to each end thereof, and anti-friction means within said blocks and interposed between the same and the roller, said blocks and anti-friction means forming a component part of said roller and portable therewith.

10. As an article of manufacture, for use in a bearing, a roller, a cup-shaped block rotatably attached to each end thereof, and anti-friction means within said blocks and interposed between the same and the roller, said blocks and anti-friction means forming a part of said roller and portable therewith.

11. As an article of manufacture, for use in a bearing, a roller, a cup-shaped block flexibly attached to each end thereof, and anti-friction means within said blocks and interposed between the same and the roller, said blocks and anti-friction means forming a part of said roller and portable therewith.

12. As an article of manufacture, for use in a bearing, a roller, a cup-shaped block rotatably and flexibly attached to each end thereof, and anti-friction means within said cups and interposed between said blocks and the roller, said blocks and anti-friction means forming a part of said roller and portable therewith.

13. As an article of manufacture, for use in a bearing, a roller, having reduced journals at its ends, and an anti-frictional end-thrust device attached to each journal and forming a component part of said roller and portable therewith.

14. As an article of manufacture, for use in a bearing, a roller, having reduced journals at its ends, a block attached to each of said journals, and anti-friction means interposed between said blocks and roller ends, said blocks and anti-friction means forming a part of said roller and portable therewith.

15. As an article of manufacture, for use in a bearing, a roller having reduced journals at its ends, a cup-shaped block attached to each of said journals and anti-friction means interposed between said blocks and roller ends, within said cups, said blocks and anti-friction means forming a component part of said roller and portable therewith.

16. As an article of manufacture, for use in a bearing, a roller having reduced journals at its ends rotatable in said roller, and an anti-friction device attached to each of said journals and forming a component part of said roller and portable therewith.

17. As an article of manufacture, for use in a bearing, a roller having reduced journals flexibly mounted in the ends thereof and attached thereto, and an anti-friction device attached to each of said journals, said journals and devices forming a component part of said roller and portable therewith.

In testimony that I claim the foregoing as my invention I have signed my name in presence of the subscribing witnesses this 30th day of October 1908.

JULIUS A. PERKINS.

Witnesses:
GEORGE E. MINER,
J. C. LARSEN.